US010059008B2

(12) United States Patent
Staab et al.

(10) Patent No.: US 10,059,008 B2
(45) Date of Patent: Aug. 28, 2018

(54) METHOD AND APPARATUS FOR USING VIBRATION TO RELEASE PARTS HELD BY A ROBOTIC GRIPPER

(71) Applicant: ABB Technology AG, Zurich (CH)

(72) Inventors: Harald Staab, Windsor, CT (US); Thomas A. Fuhlbrigge, Ellington, CT (US); William J. Eakins, Bloomfield, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/148,518

(22) Filed: May 6, 2016

(65) Prior Publication Data

US 2016/0250757 A1 Sep. 1, 2016

Related U.S. Application Data

(63) Continuation of application No. PCT/US2014/064044, filed on Nov. 5, 2014.

(Continued)

(51) Int. Cl.

*B25J 15/08* (2006.01)
*B25J 15/06* (2006.01)
*B25J 15/00* (2006.01)

(52) U.S. Cl.

CPC ........... *B25J 15/0616* (2013.01); *B25J 15/00* (2013.01); *B25J 15/065* (2013.01); *B25J 15/08* (2013.01)

(58) Field of Classification Search

CPC ...... B25J 15/00; B25J 15/065; B25J 15/0666; B25J 15/08; B25J 15/12; B25J 7/00; B25J 19/028; B25J 15/0616

(Continued)

(56) References Cited

U.S. PATENT DOCUMENTS 4,666,198 A * 5/1987 Heiserman ................. B25J 9/12 294/118
5,046,773 A * 9/1991 Modesitt .................... B25J 7/00 294/100

(Continued)

FOREIGN PATENT DOCUMENTS

CA 2 479 847 * 10/2003
DE 19581457 C1 4/1999

(Continued)

OTHER PUBLICATIONS

International Search Report, PCT/US2014/064044, ABB Technology AG, dated Feb. 18, 2015.

(Continued)

*Primary Examiner* — Dean J Kramer
(74) *Attorney, Agent, or Firm* — J. Bruce Schelkopf; Taft Stettinius & Hollister LLP

(57) ABSTRACT

A robot has a gripper for gripping parts and releasing the gripped part at a destination position. The gripped part is vibrated at the destination position to cause the gripper to release the gripped part. The gripped part can be directly vibrated or vibrated by vibrating the mechanical structure of the gripper or by vibrating air in the gripper mechanical structure. The vibrator can connect the gripper to the robot. The vibrator can be inside or attached to the one or more of the articulated fingers of the gripper. The vibrations can be stopped when a sensor detects that the gripped part has been released or after the passage of a preset vibration time.

10 Claims, 5 Drawing Sheets

208 200 202 212 201 203 209 50 207 210 51 206 214 216 205 204 52 52 33 Y X

Related U.S. Application Data

(60) Provisional application No. 61/900,566, filed on Nov. 6, 2013.

(58) Field of Classification Search
USPC ...................................... 294/213, 86.4, 99.1
See application file for complete search history.

(56) References Cited

U.S. PATENT DOCUMENTS

| | | | | |
|---|---|---|---|---|
| 6,710,512 | B2 * | 3/2004 | Tsai | B25J 7/00 310/313 R |
| 7,168,747 | B2 * | 1/2007 | Hoehn | B65G 47/90 294/64.3 |
| 7,431,364 | B2 * | 10/2008 | Huang | B25J 7/00 294/100 |
| 7,489,143 | B2 * | 2/2009 | Konno | B25J 7/00 269/86 |
| 8,317,245 | B2 * | 11/2012 | Sun | B81C 99/002 294/213 |
| 2003/0072646 | A1 | 4/2003 | Frey et al. | |
| 2005/0275232 | A1 | 12/2005 | Horie et al. | |
| 2008/0307866 | A1 * | 12/2008 | Hiroki | B25J 7/00 73/105 |
| 2009/0199651 | A1 * | 8/2009 | Park | B25J 7/00 73/796 |
| 2011/0299969 | A1 * | 12/2011 | Sun | B25J 7/00 414/800 |
| 2012/0316675 | A1 * | 12/2012 | Urano | B25J 15/0009 700/245 |

FOREIGN PATENT DOCUMENTS

| | | | |
|---|---|---|---|
| JP | H0890478 | A | 4/1996 |
| JP | 2001001286 | A | 1/2001 |
| JP | 2001315084 | A | 11/2001 |
| JP | 2002076044 | A | 3/2002 |
| JP | 2002161536 | A | 5/2002 |

OTHER PUBLICATIONS

Written Opinion, PCT/US2014/064044, ABB Technology AG, dated Feb. 18, 2015.

http://www.directindustry.com/industrial-manfuacturer/gripper-73804.html.

Brown, et al., Universal robotic gripper based on the jamming of granular material, published in PNAS, Nov. 2, 2010, vol. 107, No. 44, pp. 18809 to 18814.

* cited by examiner 31
32
33

21
21
33

11
12
14
13
33

41
42
21
33

50
51
52
33

31
34
35
32
33

82

81
80
14

METHOD AND APPARATUS FOR USING VIBRATION TO RELEASE PARTS HELD BY A ROBOTIC GRIPPER

FIELD OF THE INVENTION

This invention relates to robotic gripping of parts and more particularly to the release by the gripper of the picked parts.

DESCRIPTION OF THE PRIOR ART

In robotic gripping and pick and place the part is usually released from a gripper by opening the gripper fingers or turning off suction. This causes gravity force to detach the part from the gripper. However, especially with lightweight parts, gravity may not be strong enough to create a reliable, reproducible detachment. There may be other effects that can make the parts detach in an uncontrolled way or not at all, such as electrostatic adhesion or surface adhesion due to moisture or liquid residuals on the part or on the surface of the gripper finger(s).

SUMMARY OF THE INVENTION

A method of operating a gripper having a mechanical structure for gripping parts:

vibrates the gripped part when the gripper is at a destination position to cause the gripper to release the gripped part to the destination position.

An apparatus capable of being operated to grip a part when the apparatus is mounted on a robot has:

a housing comprising a mechanism operable to grip the part and hold the gripped part when the gripping device is in motion; and a device associated with the housing operable to cause a vibration to occur in the gripped part when the gripping device is to release the gripped part at a destination position.

A system has:

a robot;

a gripper connected to the robot for gripping a part, the gripper having a housing comprising:

a mechanism operable to grip the part and hold the gripped part when the gripper is in motion; and a vibrator associated with the gripper operable to cause a vibration to occur to the gripped part when the gripper is to release the gripped part at a destination position.

DETAILED DESCRIPTION

As is well known, robots use grippers to grasp parts and move the grasped part to a predetermined location where the robot held gripper is caused to release the grasped part so that the gripped part is brought into contact with another part or a surface. The receiving part or surface can be on a conveyor that moves the receiving part or surface to the predetermined location. When that happens, the conveyor stops so that the part gripped by the robot can be released by the gripper and thus brought into contact with the receiving part or surface. In a manufacturing environment, the released part should always be brought into contact with the receiving part or surface at the same place. However, that may not happen because for example electrostatic or surface adhesion of the gripped part with the gripper causes the gripped part when released to be not fully seated in the receiving part or surface or not be released.

Figures 1A, 1B, 1C:
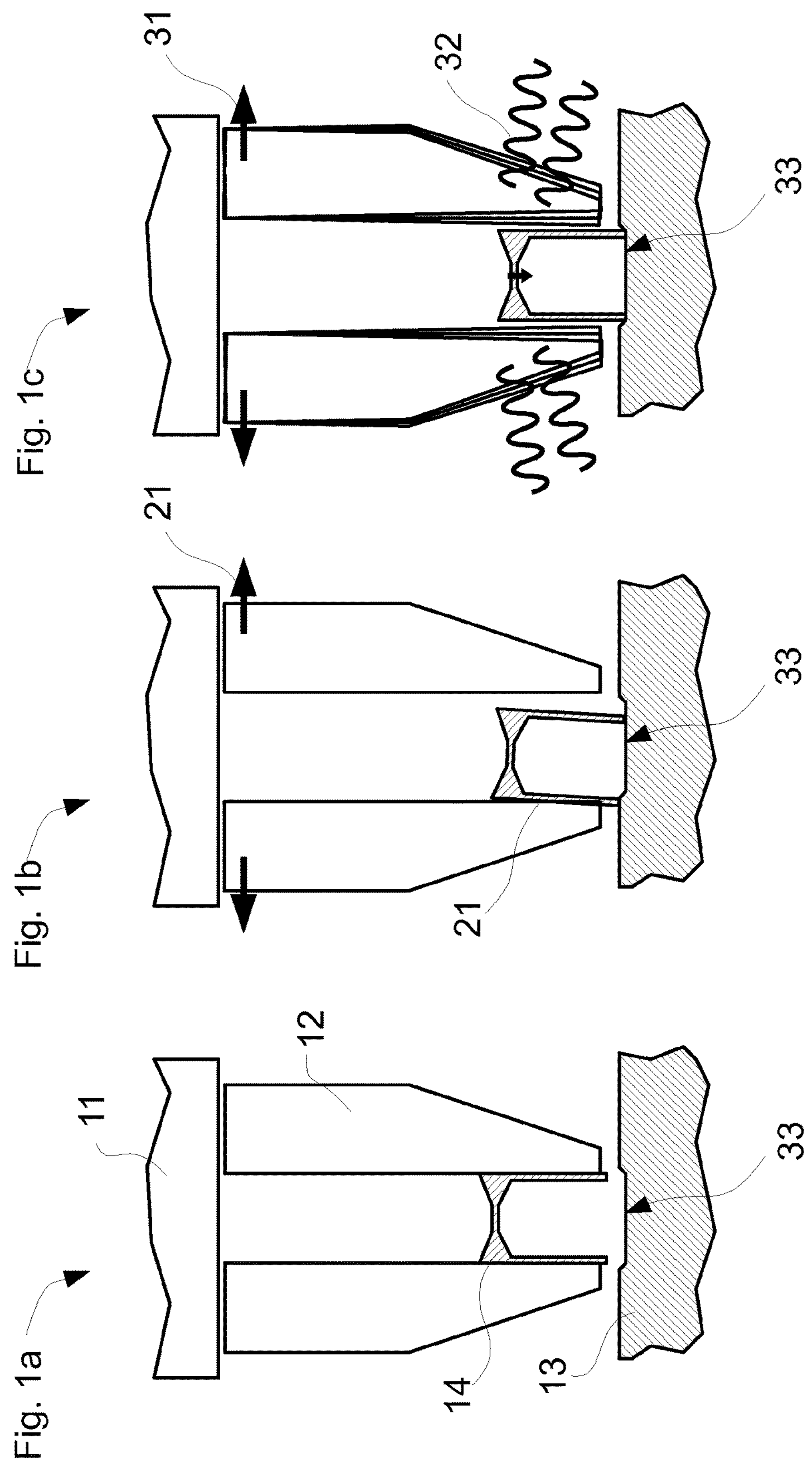
FIG. 1*a* shows a gripper body with parallel fingers holding a part that is to be placed on destination position on another part or surface.
FIG. 1*b* shows what happens when the gripper opens to release the gripped part but that part does not detach from both fingers at the same time because the part is sticking onto one of the fingers.
FIG. 1*c* illustrates in simplified form the method and apparatus that assures for a two finger parallel gripper a reproducible release of the gripped part.

Referring now to FIG. 1*a*, there is shown a gripper body or housing 11 with parallel fingers 12 holding a part 14 that is to be placed on destination position 33 on part or surface 13. FIG. 1*b* shows what happens when the gripper opens as indicated by the arrows 21 to release part 14 but part 14 does not detach from both fingers 12 at the same time because the part 14 is sticking onto one finger 12. As a result and is shown in FIG. 1*b*, the part 14 is not properly released to destination position 33 and thus part 14 is not fully seated in position 33. This is a common problem in particular for lightweight parts in the presence of electrostatic adhesion or adhesive surface effects due to moisture or liquid residuals on the part or on the finger surface.

FIG. 1*c* illustrates in simplified form the method and apparatus that assures for a two finger parallel gripper a reproducible release of the gripped part. In accordance with this method when the fingers 12 start opening as shown by arrows 31 a mechanical vibration 32 is created in both fingers 12. The vibration 32 makes the gripped part 14 immediately loosen itself from fingers 12 when the fingers 12 are opened further than the size of the part 14. The part 14 then falls into place precisely where it was positioned at with the gripper 11, that is, in the destination position 33.

Figures 2A, 2B, 2C:
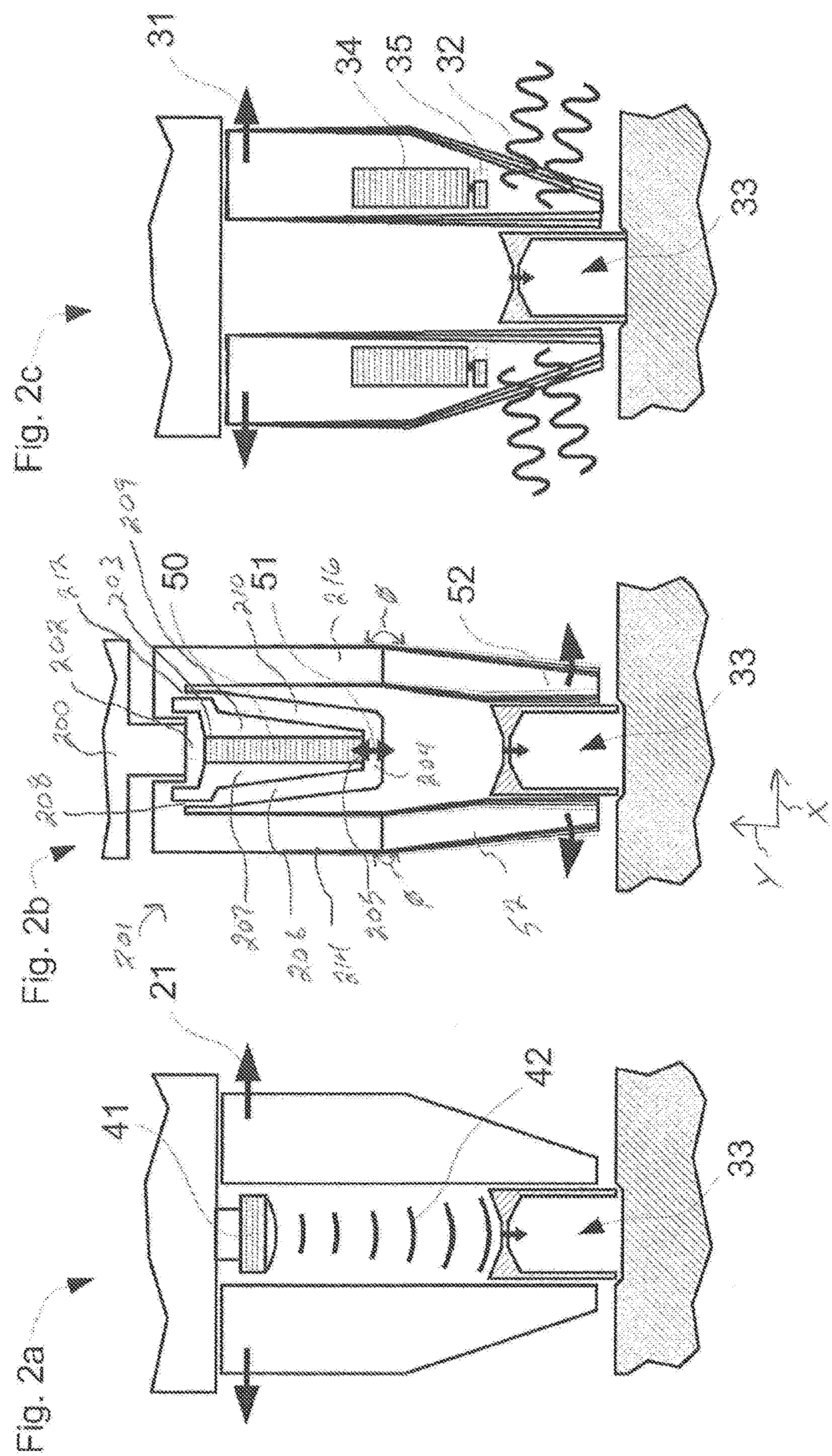
FIGS. 2*a*, 2*b* and 2*c* show three different embodiments of the present method and apparatus for two finger grippers.

FIGS. 2*a*, 2*b* and 2*c* show three different embodiments of the present method and apparatus for two finger grippers. FIG. 2*a* shows an acoustic speaker 41 located on the gripper 11, close enough to the gripped part 14 that the gripped part is set into vibration from the sound-wave 42 from the speaker. The speaker 41 is activated preferably at the same time the gripper 11 is commanded to release the part. FIG. 2*b* shows a gripper design where the gripper actuator is a piezo stack 50. The small displacement 51 of the piezo stack 50 is translated into a large displacement of the gripper fingertips 52. Since piezo stacks can be actuated with frequencies in the 100s of Hz, the piezo stack 50 when actuated creates vibration of the fingertips 52 that detaches the gripped part 14 from the gripper fingers so that the released part always lands in destination position 33. FIG. 2*c* shows another embodiment where there are small free spinning motors 34 with unbalanced mass 35 inside the gripper fingers. When the motors 35 spin, they cause mechanical vibration 32 inside the fingers that detaches the gripped part 14 from the gripper fingers so that the released part always lands in destination position 33. Referring particularly to FIG. 2*b*, a support structure 200 can operably connect a gripper mechanism 201 to a robot (not shown). The gripper mechanism 201 includes an upper actuator wall 202 and a lower actuator wall 204 engaged with opposing first and second ends 203, 205 of the piezo stack 50. First and second actuator legs 206, 210 extend from the lower wall 204 toward the upper wall 202 at an angle. A first space 207 and a second space 209 is formed between the first and second actuator legs 206, 210 respectively and the piezo stack 50 such that a distance between the piezo stack 50 and the first and second actuator legs, 206, 210 increases from the lower actuator wall 204 toward the upper actuator wall 202. The first actuator leg 206 is connected to a first living hinge 208 and the second actuator leg 210 is connected to a second living hinge 212 proximate a distal end thereof. A first finger 214 extends from the first living hinge 208 generally away from the upper wall 202 and toward the lower wall 204 on one side of the piezo stack 50. A second finger 216 extends from the second living hinge 209 generally away from the upper wall 202 and toward the lower wall 204 on an opposing side of the piezo stack 50. The fingertips 52 can extend at an angle 0 from the first and second fingers 214, 216. The piezo stack 50 is generally oriented along a Y-axis and the fingertips generally move back and forth along an X-axis normal to the Y-axis. In some forms one or more additional fingers (not shown) may be operably coupled to the piezo stack 50 and with the gripper mechanism 201 to grip an object as one skilled in the art would readily understand.

Figure 3:
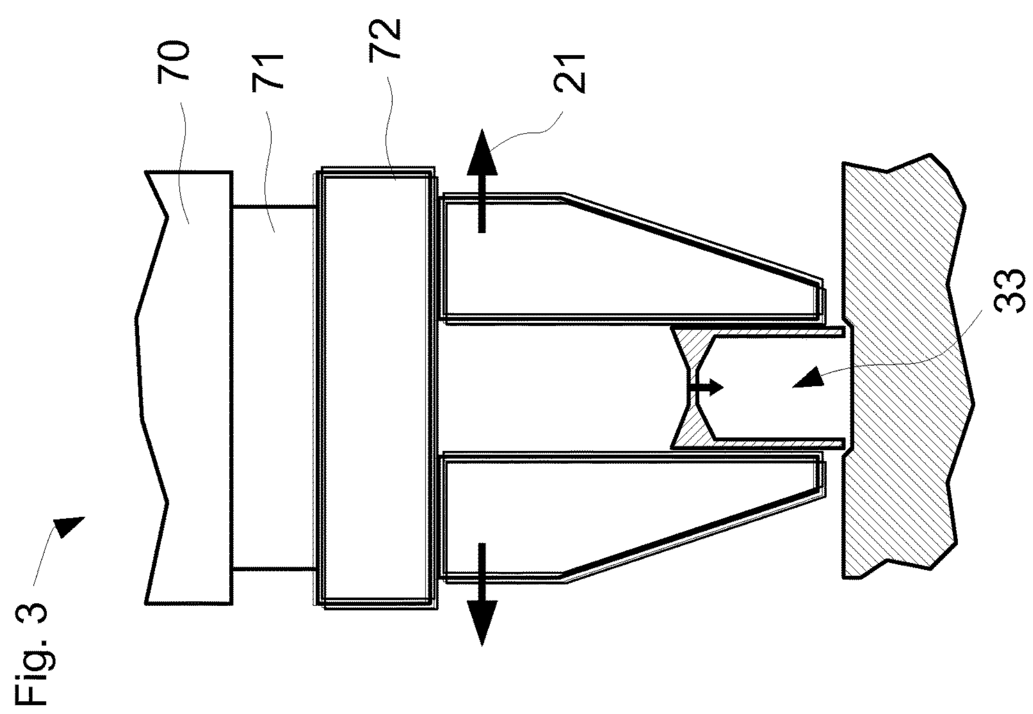
FIG. 3 shows another embodiment of the present method and apparatus for two finger grippers.

FIG. 3 shows another embodiment of the present method and apparatus for two finger grippers. In this embodiment, a vibrating body 71 is attached to the flange 70 of the robot that holds the gripper. The gripper body 72 is attached to the vibrating body 71. When the gripped part 14 is released and the gripper fingers open, the vibrating body 71 shakes the entire gripper to reliably detach the gripped part 14 from the gripper fingers so that the released part always lands in destination position 33.

Figures 4A, 4B:
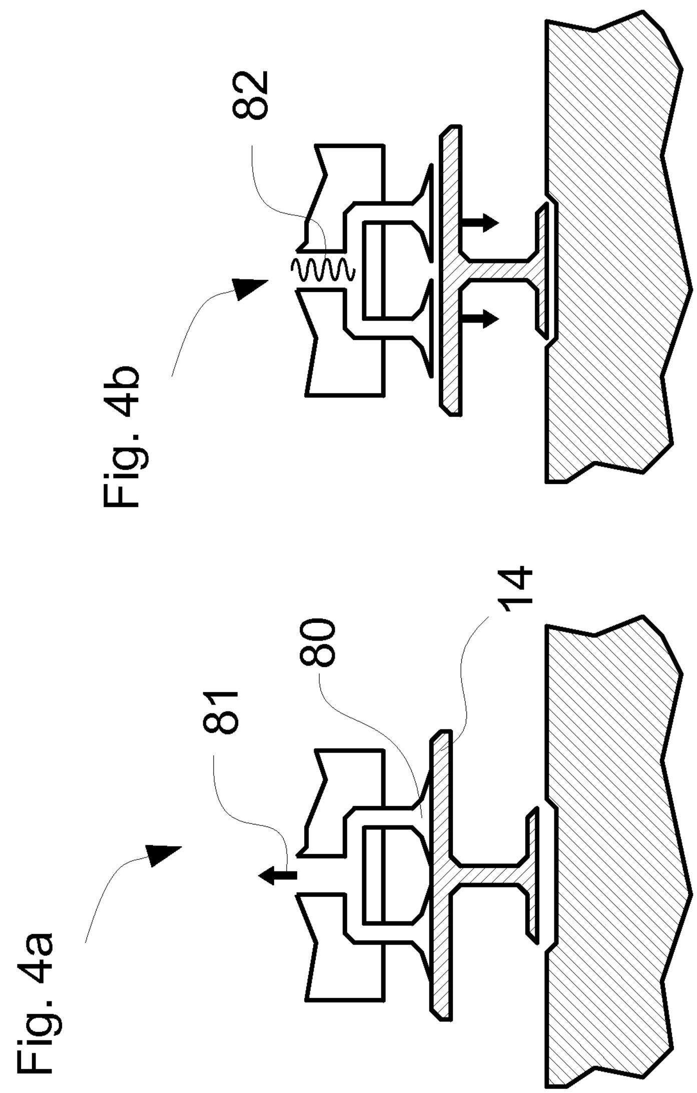
FIG. 4*a* shows a suction cup gripper with one or more suction cups where the grip is caused by a vacuum.
FIG. 4*b* shows the use of a vibration or buzzing inside the suction channel of the gripper shown in FIG. 4*a* to ensure uniform and simultaneous detachment of the gripped part from all of the suction cups.

FIG. 4*a* shows a suction cup gripper with one or more suction cups 80 where the grip is caused by vacuum 81. For release of part 14, the vacuum is turned off and gravity would cause the part 14 to detach. As shown in FIG. 4*b*, to ensure uniform and simultaneous detachment from all suction cups a vibration or buzzing 82 is created inside the suction channel. The source of vibration of the air could be a piezo disk or a speaker membrane actuating on the air channels of the suction cups.

While the present apparatus and method has been described for use with a two finger parallel gripper it should be appreciated that the apparatus and method can also be used with other grippers including but not limited as of the earliest claimed filing date of this application to:

a gripper that has one articulated finger and one or more other fingers that are fixed;

two finger centric (swiveling finger joint) grippers such as those offered for sale by Schunk GmbH & Co. KG and many other manufacturers;

three finger parallel and three finger centric grippers such as the robot adaptive gripper offered for sale by Robotiq of St. Nicolas, QC, Canada;

four or more fingers grippers; and jamming or coffee grounds gripper such as the gripper described by Brown et al. in "Universal robotic gripper based on the jamming of granular material" published in PNAS, Nov. 2, 2010, vol. 107, no. 44, pages 18809 to 18814.

Figure 5:
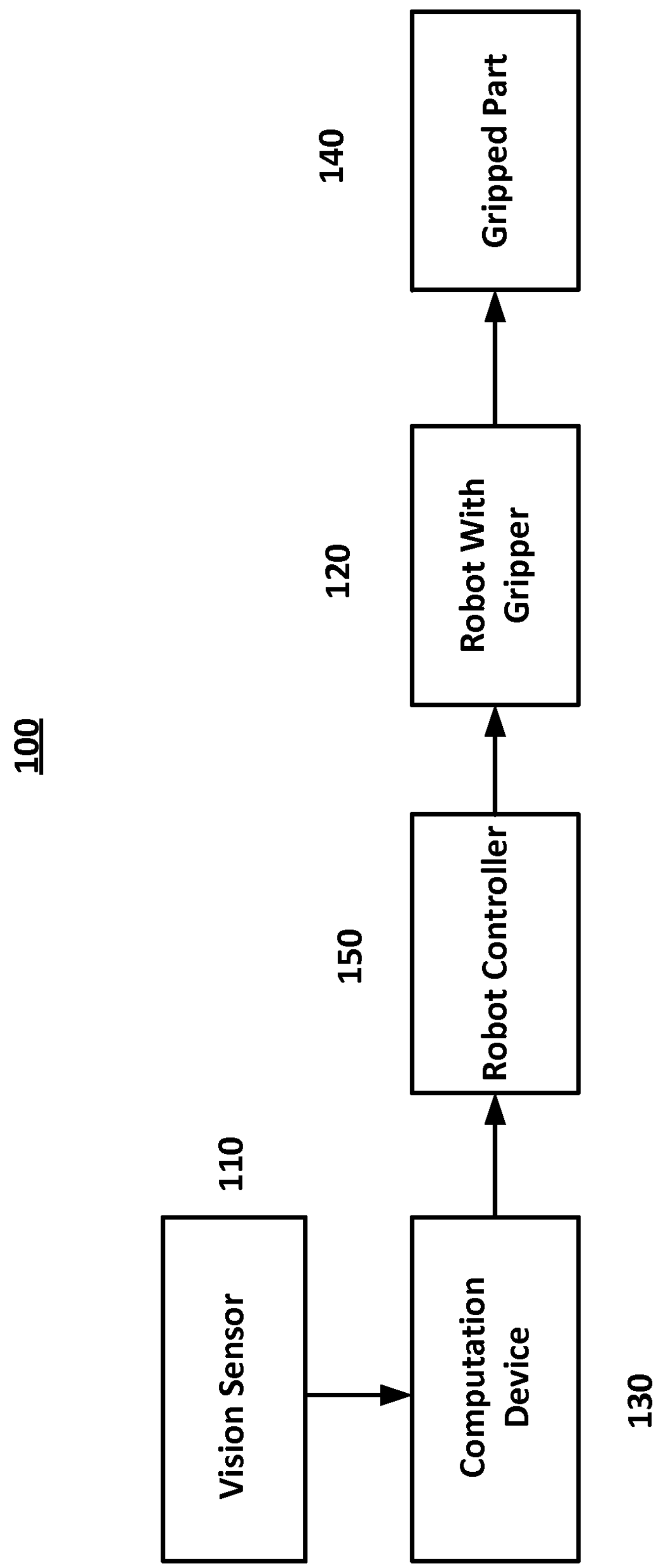
FIG. 5 shows in block diagram form an example of a six-axis industrial robot manipulator system that has a robot with a gripper to place a gripped part at a destination position.

Referring now to FIG. 5, there is shown in block diagram form an example of a six-axis industrial robot manipulator system 100 that has a robot with a gripper 120 to place a gripped part 140 at a destination position. System 100 also has a vision sensor 110 such as one or more cameras that provide images of the gripped part 140 as the robot with gripper 120 moves the gripped part 140 to the destination position. The images are provided to a computation device 130 which is connected to a controller 150 for robot with gripper 120. The images from vision sensor 110 can also be provided directly to controller 150 if the controller has sufficient processing capacity for the images. The controller 150 or the computation device 130 controls the vibration that causes the gripper to release the gripped part 140 at the destination position.

The images from vision sensor 110 can also be used to cause controller 150 or the computation device 130 to stop vibration of the gripped part 140 when those images show that the robot with gripper 120 has released the gripped part 140 at the destination position.

Instead of using images from the vision sensor 110 the controller 150 or the computation device 130 can be programmed to stop the vibrations after the passage of a preset time.

It should be appreciated that while a vision sensor is described above to detect the release of the gripped part at the destination position that other forms of sensors such as photoelectric sensors in the gripper that can distinguish between part is present and part is not present and possibly a force sensor can also be used. It should also be appreciated that depending on the type of sensor that the sensor can be mounted in the gripper, on the gripper or fixed on the robot cell at the destination, that is the release, position.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system comprising:

a robot;

a support structure associated with the robot;

a gripper operably coupled to the support structure, the gripper having a first finger and a second finger;

first and second fingertips extending at an angle from the first and second fingers, respectively, the first and second fingertips configured to hold an object therebetween in a first position and to release the object in a second position;

an actuation member defined by first and second legs extending at an angle from a lower actuation wall at a first end to a corresponding hinge at a second end, wherein each hinge is connected to a corresponding finger; and a piezo stack formed from one or more piezoelectric elements and located between the first and second legs, the piezo stack also engaged between the lower actuation wall and an upper actuation wall of the support structure; and a space defined by a distance between each leg and the piezo stack, wherein the distance decreases from the upper actuation wall to the lower actuation wall.

2. The system of claim 1, further comprising additional fingers.

3. The system of claim 1, wherein the piezo stack is operable for generating vibratory motion in the fingers of the gripper.

4. The system of claim 3, wherein the vibratory motion includes frequencies above 100 Hz.

5. The system of claim 1, further comprising a sensor operable for detecting when the object has been released from the gripper.

6. The system of claim 5, wherein the piezo stack operates when the fingertips are in the second position and is shut off when the sensor detects a release of the object.

7. The system of claim 5, wherein the piezo stack deflects the lower actuation wall through a first displacement and the legs of the actuation member deflects the fingertips through a second displacement greater than the first displacement.

8. The system of claim 1, further comprising an electronic controller for activating the gripper and the piezo stack according to predefined criteria.

9. The system of claim 1, wherein the first and second legs are oriented to converge toward each other as the first and second legs extend toward the lower actuation wall.

10. The system of claim 1, wherein respective outer surfaces of the first and second fingertips are oriented to converge toward each other as the respective outer surfaces extend toward respective ends of the first and second fingertips.

* * * * *